//
Patented Mar. 22, 1932

1,850,555

UNITED STATES PATENT OFFICE

LEOPOLD LASKA AND OSKAR HALLER, OF OFFENBACH-ON-THE-MAIN, GERMANY, ASSIGNORS TO GENERAL ANILINE WORKS, INC., OF NEW YORK, N. Y., A CORPORATION OF DELAWARE

POLY ARYL DERIVATIVES OF UREA AND PROCESS OF MAKING SAME

No Drawing. Application filed October 23, 1929, Serial No. 401,974, and in Germany November 2, 1928.

Our invention relates to new urea derivatives corresponding probably to the general formula

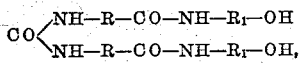

wherein R and $R_1$ represent aromatic residues of the benzene or naphthalene series, which may contain further substituents, but no free sulfonic nor carboxylic acid groups and to a process of making same. The new compounds are obtainable by condensing diaryl-urea-dicarboxylic acids in the presence of a phosphorus chloride with aminophenol or aminonaphthol compounds containing no free sulfonic nor carboxylic acid group but having at least one free ortho- or para-position related to the hydroxylgroup.

The same products may be obtained by condensing aminoarylcarboxylic acids or their corresponding halogen substitution products with aminophenols or aminonaphthols and treating the aminoaroylaminophenols and aminoaroylaminonaphthols thus obtained with phosgene. These aminoaroylaminophenol and aminoaroylaminonaphthol compounds may also be formed by condensing nitroarylcarboxylic acids with aminophenols or aminonaphthols and reducing the condensation products.

The new compounds being object of our present invention are sufficiently soluble in water in the form of their alkali metal salts in spite of the absence of free sulfonic or carboxylic groups and in spite of the largeness of their molecule. They are distinguished by a certain affinity to cotton allowing the impregnation of cotton goods with the solutions of their alkali metal salts.

In order to further illustrate our invention the following examples are given, the parts being by weight and all temperatures in centigrade degrees, but we wish it to be understood that we are not limited to the particular products nor reaction conditions mentioned therein.

Example 1

274 parts of para-aminobenzoic acid and 272 parts of sodium acetate are dissolved in about 1000 parts of water and at about 60° phosgene is passed into the solution until it is saturated. The diphenylurea-dicarboxylic acid thus separating from the solution is filtered off, washed with hydrochloric acid and then with water and dried. It is insoluble in the usual organic solvents.

30 parts of this diphenylurea-p.p'-dicarboxylic acid are mixed with 22 parts of p-aminophenol and 300 parts of dimethylaniline; at about 70–80° 10 parts of phosphorus trichloride are allowed to drop in, and finally the mixture is heated at about 120° for about 5 hours. Then the reaction mass is poured on hydrochloric acid, the precipitate formed is filtered off and stirred with a sodium carbonate solution until an alkaline reaction. The dimethylaniline is expelled by steam and the condensation product thus obtained may be purified by dissolving it in an alkaline solution and precipitating it again with carbonic acid. It corresponds probably to the formula

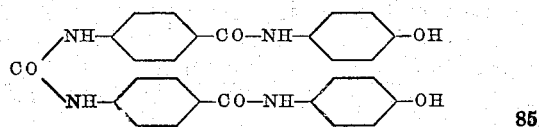

It melts above 300° and is insoluble in the usual organic solvents.

The production of the new compound as described hereinbefore may be illustrated by the following equations:

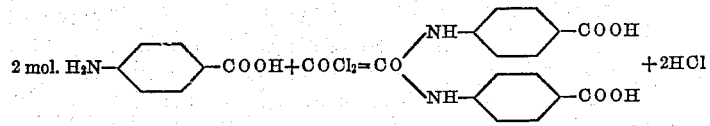

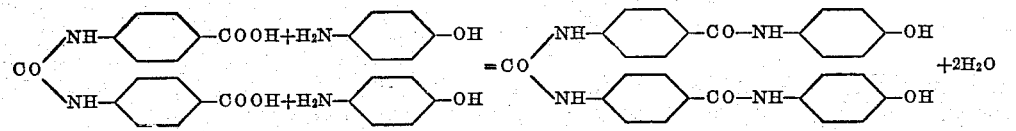

Example 2

A mixture of 60 parts of diphenylurea-p.p'-dicarboxylic acid, 48 parts of o-amino-p-cresol and 400 parts of dimethylaniline is allowed to react with 24 parts of phosphorus trichloride as described in Example 1. The reaction mass is worked up in a like manner. The new condensation product thus obtained corresponds to the probable formula:

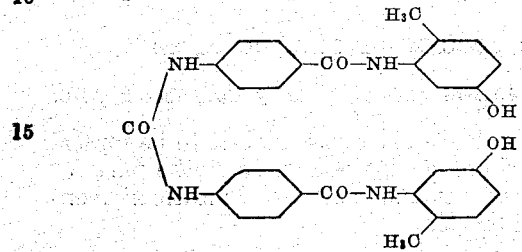

It may be purified by dissolving it in an alkaline solution and precipitating again by carbonic acid. It melts at about 215–217°.

When replacing o-amino-p-cresol for instance by p-amino-o-cresol, m-amino-o-cresol or m-amino-p-cresol and carrying out the process otherwise as described above similar products are obtained.

Example 3

274 parts of m-aminobenzoic acid and 272 parts of sodium acetate are dissolved in about 1000 parts of water, and at about 60° phosgene is passed into this solution. The diphenylurea-m.m'-dicarboxylic acid thus separating from the solution is filtered off, washed with hydrochloric acid and then with water and dried. It melts at about 290–293°.

30 parts of this diphenyl-urea-m.m'-dicarboxylic acid are mixed with 22 parts of m-aminophenol and 300 parts of dimethylaniline, and at about 70–80° 10 parts of phosphorus trichloride are allowed to drop in. After having been heated at about 120° for about 5 hours the reaction mass is poured on hydrochloric acid, the precipitate thus formed is filtered off and stirred with a sodium carbonate solution until an alkaline reaction. The dimethylaniline is expelled by steam and the new condensation product may be purified as described in the foregoing examples. It corresponds probably to the formula:

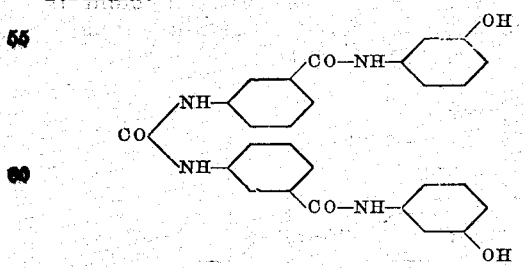

It is insoluble in the usual organic solvents, the unpurified product melts at about 255–257° with decomposition. The reaction can be carried out in the same manner when replacing m-aminophenol by 1.5- or 2.7-aminonaphthol or when starting from the urea derivative of the 2.3-aminonaphthoic acid.

Example 4

Into a mixture of 30 parts of dephenylurea-m.m'-dicarboxylic acid, 22 parts of p-aminophenol and 300 parts of dimethylaniline at about 70–80° 10 parts of phosphorus trichloride are allowed to drop in, and the mixture is heated at about 120° for about 5 hours. The reaction mass is worked up as described in the foregoing examples. The new condensation product thus obtained corresponds probably to the formula:

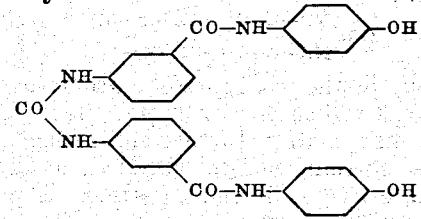

It is insoluble in the usual organic solvent and melts in a raw state at about 255° while decomposing.

Example 5

Into a mixture of 167 parts of m-nitrobenzoic acid, 109 parts of m-aminophenol and 1500 parts of toluene at about 70–80° 60 parts of phosphorus trichloride are allowed to drop in, and the mixture is heated at about 110° until the evolution of hydrochlorid acid gas ceases. The reaction mass is made alkaline by adding sodium carbonate, the toluene is expelled by steam and the reaction product is purified as described above. It crystallizes from glacial acetic acid and melts in a pure state at about 219°.

129 parts of this m'-nitrobenzoyl-m-aminophenol are dissolved in about 400 parts of ammonia (density 0,91) and about 1500 parts of alcohol; the solution is heated to boiling and then slowly 200 parts of zinc dust are added. After heating the mass for some hours to boiling, the solution is filtered while still hot and the formed m'-aminobenzoyl-m-aminophenol separates on cooling in the form of a sandy powder. It crystallizes difficultly from organic solvents, but it is soluble in glacial acetic acid.

228 parts of this m'-aminobenzoyl-m-aminophenol are dissolved in about 1500 parts of glacial acetic acid and 136 parts of sodium acetate. Into this solution at about 80° phosgene is passed until the mixture is saturated. The separating condensation product is filtered off, washed with hydrochloric acid and water and dried. It is identical with the condensation product from diphenylurea-m.m'-dicarboxylic acid and m-aminophenol, described in Example 3.

The course of the single steps of reaction may be illustrated by the following scheme of formula:

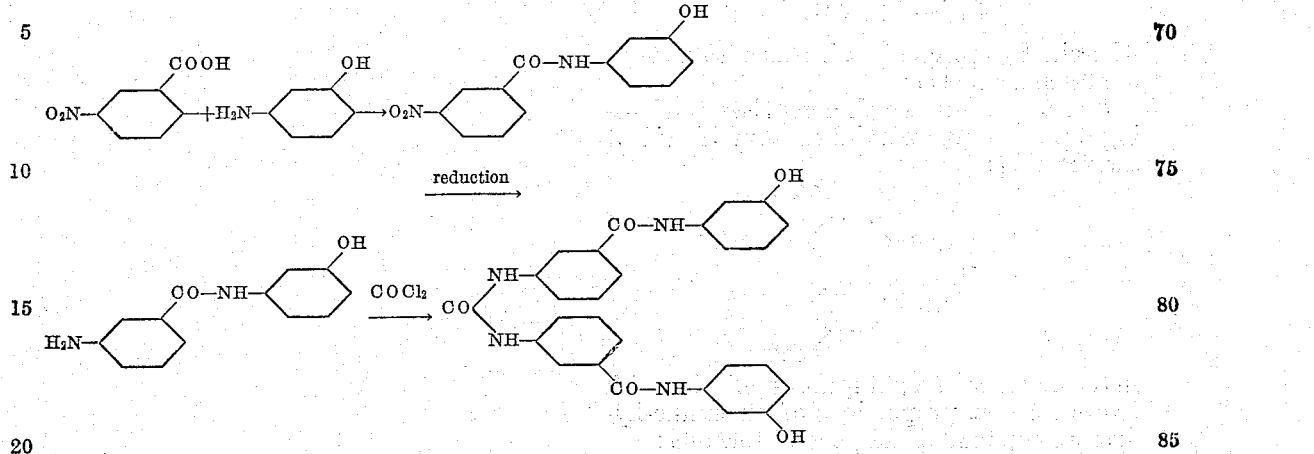

We claim:

1. As new compounds urea derivatives corresponding probably to the general formula:

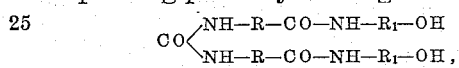

wherein the R's stand for benzene or naphthalene nuclei and the $R_1$'s represent benzene, toluene or naphthalene nuclei, which products are insoluble in the usual organic solvents, but in the form of their alkali metal salts are soluble in water, and have affinity to the vegetable fiber.

2. As new compounds urea derivatives corresponding probably to the general formula:

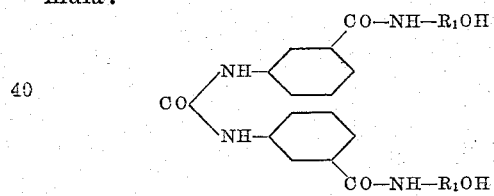

wherein the $R_1$'s represent benzene, toluene or naphthalene nuclei, which products are insoluble in the usual organic solvents, but in the form of their alkali metal salts are soluble in water, and have affinity to the vegetable fiber.

3. As new compounds urea derivatives corresponding probably to the formula

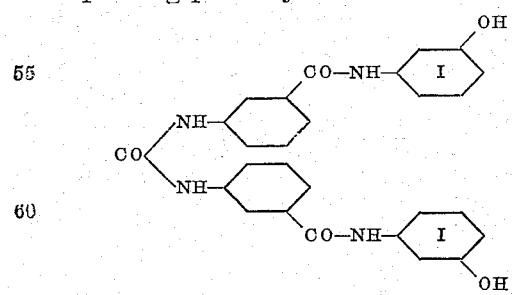

wherein the benzene nuclei containing the hydroxylgroup and signified by I may contain methyl groups, which products are insoluble in the usual organic solvents, but in the form of their alkali metal salts are soluble in water, and have affinity to the vegetable fiber.

4. As a new compound the urea derivative corresponding probably to the formula

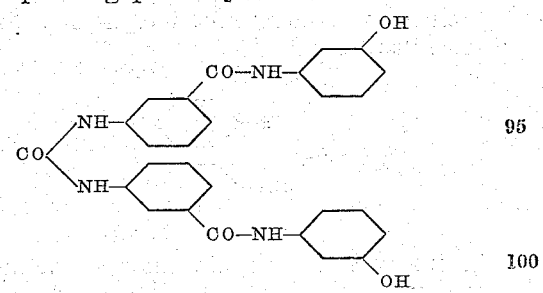

which product is insoluble in the usual organic solvents, the unpurified product melts at about 255–257° while decomposing, and the alkali metal salts of which are soluble in water and have affinity to the vegetable fiber.

5. The process which comprises condensing a diaryl-urea-dicarboxylic acid of the general formula:

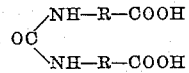

wherein the R's stand for benzene or naphthalene nuclei, in the presence of a phosphorus chloride with two molecular proportions of an amino-hydroxy compound of the general formula:

$$H_2N—R_1—OH$$

wherein $R_1$ represents a benzene, toluene or naphthalene nucleus.

6. The process which comprises condensing a diaryl-urea-dicarboxylic acid of the general formula:

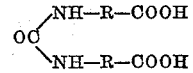

wherein the R's stand for benzene or naphthalene nuclei, in the presence of phosphorus trichloride with two molecular proportions of an amino-hydroxy compound of the general formula:

$$H_2N-R_1-OH$$

wherein $R_1$ represents a benzene, toluene or naphthalene nucleus.

7. The process which comprises condensing diphenyl-urea-m.m'-dicarboxylic acid of the formula:

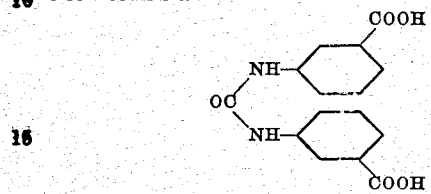

in the presence of a phosphorus chloride with two molecular proportions of an amino-hydroxy compound of the general formula:

$$H_2N-R_1-OH$$

wherein $R_1$ represents a benzene, toluene or naphthalene nucleus.

8. The process which comprises condensing diphenyl-urea-m.m'-dicarboxylic acid of the formula:

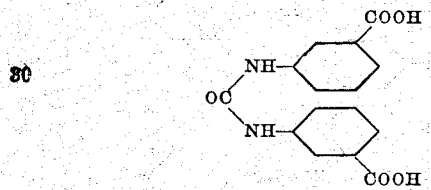

in the presence of phosphorus trichloride with two molecular proportions of an amino-hydroxy compound of the general formula:

$$H_2N-R_1-OH$$

wherein $R_1$ represents a benzene, toluene or naphthalene nucleus.

In testimony whereof, we affix our signatures.

LEOPOLD LASKA.
OSKAR HALLER.